United States Patent [19]

Oswald

[11] 3,725,764

[45] Apr. 3, 1973

[54] SERVO POSITIONING SYSTEM FOR MAGNETIC DISK MEMORY INCLUDING RADIAL RUNOUT SERVO COMPENSATION

[75] Inventor: Richard K. Oswald, San Jose, Calif.

[73] Assignee: International Business Machines Corporation, Armonk, N.Y.

[22] Filed: Apr. 1, 1971

[21] Appl. No.: 130,118

[52] U.S. Cl. ................318/629, 318/621, 340/174.1

[51] Int. Cl. ...........................G05b 11/01, G05b 6/02

[58] Field of Search...............318/576, 611, 621, 629

[56] References Cited

UNITED STATES PATENTS

| | | | |
|---|---|---|---|
| 3,362,021 | 1/1968 | Mo et al. | 318/576 X |
| 3,351,829 | 11/1967 | Quarnstrom | 318/611 |
| 2,439,198 | 4/1948 | Bedford | 318/621 |
| 2,472,167 | 6/1949 | Matson, Jr. et al. | 318/621 |
| 2,767,361 | 10/1956 | Blomquist et al. | 318/621 |
| 2,605,451 | 7/1952 | Ward et al. | 318/611 X |
| 3,051,883 | 8/1962 | Smith | 318/611 |

*Primary Examiner*—T. E. Lynch
*Attorney*—Hanifin & Jancin and Edward M. Suden

[57] ABSTRACT

Servo apparatus for accurately following a servo track on a moving surface. The track possesses a degree of radial runout from a nominal position. A first transducer is mounted on a movable arm to indicate the lateral direction and distance from the servo track. The movable arm is positioned laterally with respect to the servo track by a servo motor. A second transducer measures the velocity of said first transducer for generating a signal indicative of the magnitude of the radial runout existing within the servo positioning system. Correction means is used to combine the output from said first transducer and from second transducer to produce a positioning error signal to the servo motor such that the first transducer will exactly follow the radial runout present in the servo positioning system.

6 Claims, 4 Drawing Figures

INVENTOR.
RICHARD K. OSWALD

BY Edward M. Suden
ATTORNEY

SERVO POSITIONING SYSTEM FOR MAGNETIC DISK MEMORY INCLUDING RADIAL RUNOUT SERVO COMPENSATION

BACKGROUND OF THE INVENTION

1. Field of the Invention

The invention relates to servo tracking systems and, more particularly, to curve or track following servo apparatus.

2. Prior Art

There are numerous applications for curve following servo systems wherein a high degree of accuracy is desirable. One such application arises in magnetic disk file systems where the disks are interchangeable. Although the disks are carefully made, a recorded disk cannot be removed from and be replaced on a machine spindle without destroying the concentricity of the data tracks with the spindle. This produces an amount of radial runout which must be compensated for in order to utilize high density recording techniques. In such techniques, the data tracks are extremely narrow and close together, so that runout may cause loss of data signal at the reading head and may cause the head to read data from the wrong track.

Previously, various servo systems have been developed to attempt to make the data head follow the data tracks. For example, in a magnetic disk memory system which has a separate servo surface a servo transducer is positioned with respect to servo track such that the data heads which are moved in conjunction with the servo transducer will be centered over the desired data track. The output of the servo transducer provides an indication of the instanteous amount and direction of runout which is used to drive a servo apparatus to compensate for runout. Although this technique clearly improves the tracking of the data head, the response of the servo apparatus to servo signals is not instanteous. A small, but irreducable time lag in the servo system prevents exact compensation for runout and prevents the use of high track densities.

The frequency of the radial runout is equal to the speed of rotation of the magnetic disk. The time lag inherent in the servo system can be predicted by evaluating the servo system transfer function at the frequency of the radial runout. A component may be added in series with the servo system such that the new transfer function of the new system evaluated at the radial runout frequency, would have the time lag of zero. This component, however, would be mechanical in nature and difficult and expensive to implement.

System theory would further indicate that the series component could be moved into the present servo system by well-known transposition criteria. However, this approach would involve the insertion of a component within the feedback portion of the servo system. Since the mechanical configuration of a head positioning servo defines a mechanical position feedback path with unity gain, direct transposition criteria do not yield a practical realizable system.

One solution to this problem can be found in U.S. Pat. No. 3,362,021 entitled "Servo Positioning System for Magnetic Disk Memory." This patent solves the problem by placing a second magnetic transducer at a fixed position with reference to the servo surface ahead of the servo transducer such that the radial runout error signal generated in the second transducer will be generated at exact time necessary to compensate for the time lag inherent in the servo system.

The advantages of this system over prior art systems is its ease in implementation and low cost. Further by using the velocity of the servo transducer as an input to the system, the servo information on the disk is not used for this purpose. The advantage to this being that the output of the tachometer will always be a sinusoid of the frequency of rotation of magnetic disk having a magnitude indicative of the radial runout being present in the system at any particular instant of time. It should be noted that it is possible for the radial runout to be greater than one track width, which in other systems might cause an erroneous radial runout signal to be generated if the servo information was used to generate the radial runout signal due to the characteristics of the servo patterns used in the present state of the art. While the actual track eccentricity is greater than one data track, it is possible to have the servo transducer on a movable servo arm not moving more than ± ½ a data track from the desired track center because it is attempting to follow the servo track. This condition would cause an erroneous signal to be generated in any given fixed transducer. This is to say the signal being inputed to the fixed transducer sensing the servo data would not be a sinosoid of the frequency of rotation of the magnetic disk but either a complex waveform or a sinusoid of a multiple of the frequency of rotation of the magnetic disk. Therefore, applicant's invention overcomes this problem and has the advantage of greater versatility and capability of correcting for greater degrees of track eccentricity than was heretofore known in the art.

It is therefore an object of the present invention to provide a new servo apparatus which is capable of exactly following a curve or track.

It is another object of the present invention to provide a new servo apparatus which is capable of exactly following a servo track recorded on a magnetic surface.

It is another object of the present invention to provide a servo system which detects the amplitude and frequency of the radial runout of the servo track by monitoring the velocity of the servo transducer.

It is another object of the present invention to combine the radial runout signal with the error signal generated by the servo transducer and its detector to obtain a new error positioning signal which exactly compensates for the radial runout of the servo track.

SUMMARY OF THE INVENTION

Briefly in accordance with the present invention, there is provided a servo track, a first sensing means for indicating the lateral direction and distance from the center of the designated servo track of the sensing means, actuating means for positioning first sensing means, a second sensing means for sensing the velocity of said first sensing means and for generating a velocity signal which is indicative of the magnitude and frequency of radial runout, and a combining means for combining the output signals from the first transducer and the error signal output from the detector which provides a first error signal as a function of the signal induced in the first transducer such that a new error positioning signal is generated for controlling the actuating means so that the first transducer will exactly follow the servo track and the inherent time lag of the servo positioning system will be reduced to zero at the radial runout frequency.

IN THE DRAWINGS

The foregoing and other objects, features and advantages of the invention will be apparent from the following more particular description of the preferred embodiment of the invention, as illustrated in the accompanying drawings.

DETAILED DESCRIPTION OF THE PREFERRED EMBODIMENT

Figure 1:
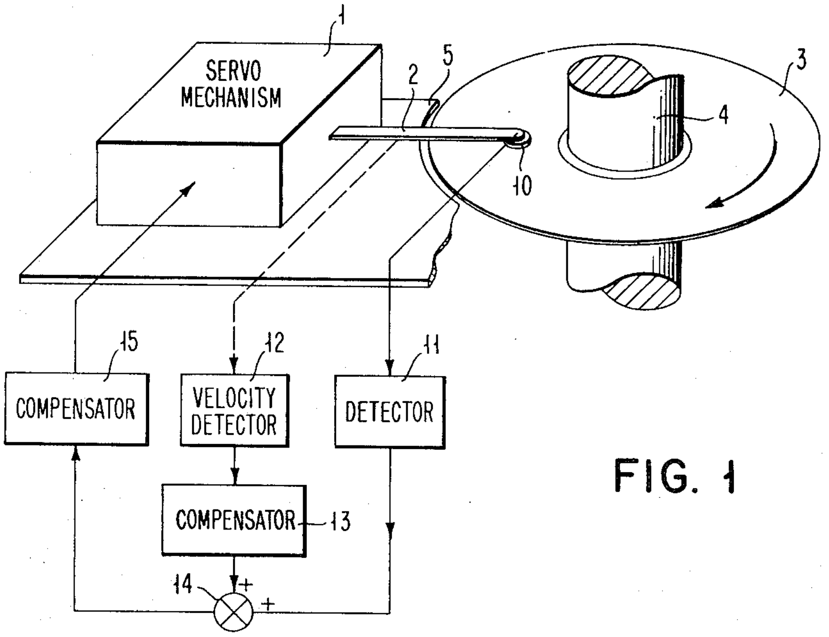
FIG. 1 is a block diagram of the preferred embodiment of the invention.

Referring to the figure, there is shown a curve-following servo apparatus as used with a magnetic disk data storage system. It should be noted however that the figure only shows those elements of the overall magnetic disk memory that are necessary to understand the invention.

The servo transducer 10 is permanently attached to servo arm 2 of servo mechanism 1. The servo transducer 10 is positioned by means of servo mechanism 1 with relationship to a servo disk 3 and more particularly to a desired servo track located on the servo disk 3. Servo disk 3 is removably mounted to spindle 4 for rotating magnetic disk 3. Magnetic disk 3 has on its surface a encoded servo pattern such that a signal is generated within servo transducer 10 that is indicative of the position of servo transducer 10 with reference to the desired position on the servo disk 3. The signal generated in servo transducer 10 is fed to detector 11. Detector 11 generates an error position signal that is indicative of the position of the servo transducer 10 with reference to the desired servo track on magnetic disk 3. Such a system is well-known in the art as exemplified by U.S. Pat. No. 3,534,344 entitled "Method and Apparatus for Recording and Detecting Information" which teaches a possible track configuration and necessary detection circuitry for producing the error positioning signal.

A second detector 12 is used to measure and produce an electric signal indicative of the velocity of servo transducer 10 referenced to base plate 5. The output of detector 12 is an electrical signal whose magnitude and frequency is indicative of the magnitude and frequency of the radial runout present within the system. Detector 12 may take the form of any device capable of measuring the velocity of the servo head and producing an electrical signal representative of that velocity, for example, a tachometer.

The output of detector 12 is fed into a compensator 13 which varies the phase and magnitude of the output signal of detector 12. The output of compensator 13 is combined with the error position signal from detector 11 by adder 14. The output of adder 14 is passed through compensator 15. The output of compensator 15 is a new error positioning signal for controlling servo mechanism 1 for positioning the servo transducer 10 in such a manner that no time lag exists within the servo system. Therefore, the compensating means is comprised of compensator 13, compensator 15 and adder circuitry 14.

The transfer functions of compensators 13 and 15 are derived in the following manner.

Figure 2:
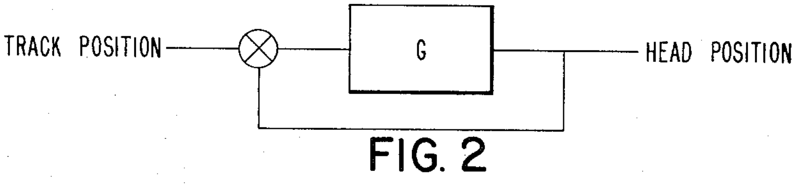
FIG. 2 is a system diagram of a servo positioning system not having applicant's invention.

First, consider the servo system without applicant's invention. FIG. 2 shows a system diagram representative of that system. FIG. 2 shows the forward transfer function as being G and the feedback transfer function being equal to unity. It should be realized that G in the real world is a complex function but designed such that the system is stable. Under these conditions, the servo positioning system will have a transfer function of $$G/(1+G) \qquad (1)$$

Figure 3:
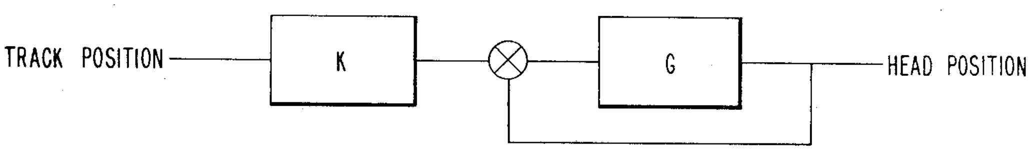
FIG. 3 is a system diagram of a system having a compensating network in series with the system as shown in FIG. 2, so as to produce the desired transfer function.

As previously stated, the time lag inherent within the system with respect to the radial runout associated with the system can be found by evaluating the transfer function for the system at the radial runout frequency. The time lag will be represented by a phasor having the magnitude of X at an angle $\theta$ such that $$X \angle \theta = [G/(1+G)]\Big|_{\omega_0} \qquad (2)$$

where $\omega_0$ is the radial runout frequency. System theory teaches that a desired system can be formed, that is, a system where the phasor $X \angle \theta$ is equal to zero, by placing in series with the system, as shown in FIG. 2, another component to form a new system having the desired transfer function. Such a new system is shown in FIG. 3 and the system transfer function for that system is $$KG/(1+G) \qquad (3)$$

such that $$[KG/(1+G)]\Big|_{\omega_0} = X \angle \theta = 1 \angle 0° \qquad (4)$$

From equation 4, it can be realized that from knowing the complex form of $G$, that the proper form for $K$ can be deduced. The simplest practical form of $K$ is $$K=(S\tau_1+1)/(S\tau_2+1) \qquad (5)$$

Assuming the form of $K$ as shown in equation 5, the magnitude of the phasor in equation 4 will approach unity, therefore to find the values for variables $\tau_1$ and $\tau_2$ in equation 5, it is only necessary to attempt to meet the angle requirement, i.e., $\theta = 0°$. Thus, knowing $\theta$ and $\omega_0$, $\tau_1$ and $\tau_2$ can be obtained from solving simultaneously equations 5(a) and 5(b) for $\tau_1$ and $\tau_2$ $$\omega_0 = 1/\sqrt{\tau_1\tau_2} \qquad (5a)$$

$$\theta = \arctan\,[\tau_2 - \tau_1)/2\sqrt{\tau_1\tau_2}] \qquad (5b)$$

Figure 4:
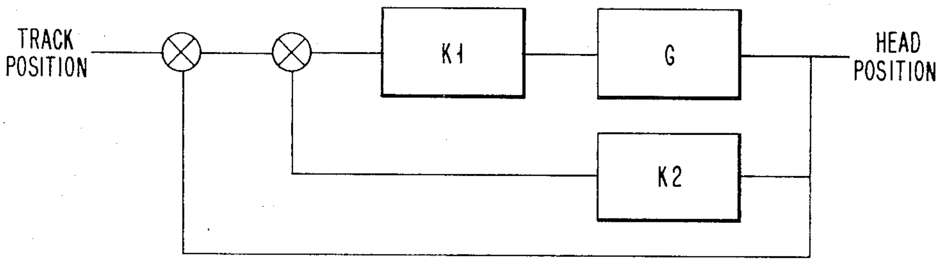
FIG. 4 is a system diagram of applicant's invention as shown in FIG. 1.

FIG. 4 is the system diagram of applicant's preferred embodiment as shown in FIG. 1, where the element having the transfer function of K1 is equal to compensator 15 and the element having a transfer function of K2 is equal to compensator 13. It is desired to have the system transfer function of the desired system as shown in FIG. 3 to be equal to the transfer function of the system shown in FIG. 4. The transfer function of the system as shown in FIG. 4 is $$K_1G/[1+K_1G(1+K_2S)] \quad (6)$$

Therefore $$KG/(1+G)=K_1G/[1+K_1G(1+K_2S)] \quad (7)$$

By inspection $$K=K_1 \quad (8)$$

and $$1=K_1(1+K_2S) \quad (9)$$

By inserting 8 into 9 and solving for $K_2$, we obtain $$K_2=[(1/K)-1](1/S) \quad (10)$$

Finally, inserting equation 5 into equations 8 and 10 and simplifying equation 10, we obtain $$K_2=(\tau_2-\tau_1)/(S\tau_1+1) \quad (11)$$

$$K_1=(S\tau_1+1)/(S\tau_2+1) \quad (12)$$

It can be readily realized by those skilled in the art that the transfer function associated with $K_1$ is a classical lead lag network and that the transfer function associated with $K_2$ is a simple low pass filter. Both the lead lag network and low pass filter having their associated transfer functions are easily implemented into hardware by performance of standard network synthesis as is well-known within the field.

Therefore, compensator 15 is a lead lag network having a transfer function associated with $K_1$ as shown in equation 12. Compensator 13 is a low pass filter having a transfer function associated with $K_2$ as shown in equation 11.

While the invention has been particularly shown and described with reference to preferred embodiments thereof, it will be understood by those skilled in the art that various changes in form and details may be made therein without departing from the spirit and scope of the invention.

What I claim is:

1. Servo apparatus for following a servo track comprising:

a first sensing means for generating a first signal as a function of said first sensing means position with respect to said servo track;

a first detector for receiving said first signal and forming a first error position signal from said first signal;

a second means for sensing the velocity of said first sensing means and for generating a second signal indicative of said sensed velocity, said second signal being representative of the magnitude and frequency of the radial runout associated with said servo track;

a compensating means for combining said first and said second signals and for modifying said combined signals to form a second error position signal; and an actuating means for moving said first sensing means in response to said second error position signal such that said first sensing means follows any eccentricity in said servo track.

2. A servo system as set forth in claim 1 wherein said compensating means further comprises:

a first compensator for receiving said second signal from said second sensing means, said first compensator varying the phase and magnitude of said second signal;

an adder means for adding together said first signal and the output from said first compensator;

a second compensator for varying the phase and magnitude of the combined signal from said adder.

3. A servo apparatus as set forth in claim 2 wherein said first compensator has the transfer function of $$(\tau_2-\tau_1)/(S\tau_1+1)$$

4. A servo apparatus as set forth in claim 3 wherein said second compensator has the transfer function of $$(S\tau_1+1)/(S\tau_2+1)$$

5. A servo apparatus as set forth in claim 3 wherein said first compensator is an electronic low pass filter.

6. A servo apparatus as set forth in claim 4 wherein said second compensator is an electronic lead/lag network.

* * * * *